(12) United States Patent
Moriyama

(10) Patent No.: US 6,598,049 B1
(45) Date of Patent: Jul. 22, 2003

(54) DATA STRUCTURE IDENTIFYING METHOD AND RECORDING MEDIUM

(75) Inventor: Koichi Moriyama, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/156,735

(22) Filed: Sep. 17, 1998

(30) Foreign Application Priority Data

Sep. 19, 1997 (JP) .............................. 9-255641

(51) Int. Cl.$^7$ .............................. G06F 17/30
(52) U.S. Cl. ...................... 707/100; 707/101
(58) Field of Search .............................. 707/2, 3, 10, 4, 707/5, 6, 8, 9, 100, 101, 102, 103, 104, 202, 203, 511, 522, 523, 524; 709/107; 710/33

(56) References Cited

U.S. PATENT DOCUMENTS

| | | | |
|---|---|---|---|
| 5,117,351 A | * 5/1992 | Miller ......................... | 707/10 |
| 5,426,747 A | 6/1995 | Weinreb et al. ............. | 711/203 |
| 5,581,765 A | * 12/1996 | Munroe et al. ............. | 709/107 |
| 5,913,217 A | * 6/1999 | Alger et al. ................. | 707/101 |
| 5,946,680 A | * 8/1999 | Shorter et al. ................. | 707/3 |
| 6,044,415 A | * 3/2000 | Futral et al. .................. | 710/33 |

FOREIGN PATENT DOCUMENTS

EP  0 365 1151 A  4/1990

OTHER PUBLICATIONS

Moss J E B: "Working With Persistent Objects to Swizzle or Not to Swizzle" IEEE Transactions on Software Engineering, vol. 18, No. 8, Aug. 1, 1992, pp. 657–673, XP000343278.

Nobuhisa Fujinami et al: "Naming and Addressing of Objects Without Unique Identifiers" Jun. 9, 1992, Proceedings of the International Conference on Distributed Computin Systems, Yokohama, Jun. 9–12, 1992, NR. Conf. 12, pp.(s) 581–588, Institute of Electrical and Electronics Engineers XP000341055.

Hughes L: "Object Identification in the Lego Kernel" Software Practice & Experience, vol. 23, No. 4, Apr. 1993, pp. 405–418, XP000655838.

* cited by examiner

*Primary Examiner*—Sanjiv Shah
(74) *Attorney, Agent, or Firm*—Frommer Lawrence & Haug LLP; William S. Frommer; Glenn F. Savit

(57) ABSTRACT

In a data structure identifying method, objects and/or data structures are differentiated by using an identifier. The identifier is formed by using an index in place of an address, thereby reducing a required number of bits for describing the address. A table is used for representing the relationship between the index and the address. To ensure that the identifier is unique on a time axis, the index is combined with a time stamp or a counter. The identifier further includes a format determining portion, such as an object identifier "OID" format bit and/or a reserved bit, which may be used for determining the presence or the absence of a network address. The identifier is thus applicable to an expandable system. As a result, it is possible to provide a data structure identifying method in which only a small number of bits are required and in which a high level of system performance can be maintained. A recording medium in which a program implementing the above data structure identifying method is recorded is also provided.

17 Claims, 15 Drawing Sheets

FIG. 4
| INDEX | ADDRESS | COUNTER |
|---|---|---|
| 0 | 0x00000000 | 0 |
| 1 | 0x80000FA0 | 1023 |
| 2 | 0x80000FAC | 1021 |
| 3 | 0x8000FFC4 | 53 |
| ... | ... | ... |
| 35 | 0x80000FB8 | 249 |
| 36 | 0x800CFFFC | 989 |
FIG. 5
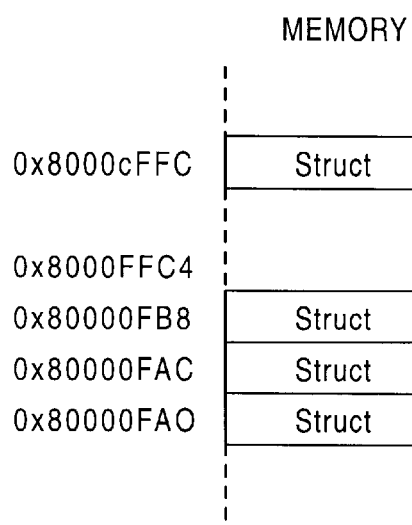
FIG. 6
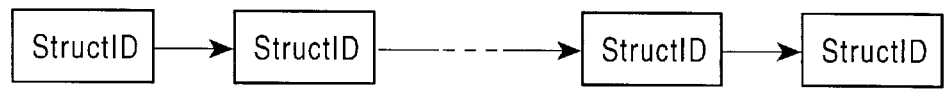

BIT FOR DETERMINING
THE PRESENCE OR ABSENCE
OF NETWORK ADDRESS

FIG. 13A

| TIME STAMP | INDEX |
|---|---|

FIG. 13B

| INDEX | ADDRESS |
|---|---|
|  |  |
|  |  |
|  |  |
|  |  |
|  |  |
|  |  |
|  |  |

| INDEX | ADDRESS | COUNTER |
|-------|---------|---------|
| 0 | 0x00000000 | 0 |
| 1 | 0x80000FA0 | 1023 |
| 2 | 0x80000FAC | 1021 |
| 3 | 0x8000FFC4 | 53 |
| ⋮ | ⋮ | ⋮ |
| 35 | 0x80000FB8 | 249 |
| 36 | 0x800CFFFC | 989 |

ADDRESS

TIME STAMP

IDENTIFIER FOR A

0x2F0A

DATA STRUCTURE IDENTIFYING METHOD AND RECORDING MEDIUM

BACKGROUND OF THE INVENTION

1. Field of the Invention

The present invention relates to a data structure identifying method for use in an object-oriented operating system. The invention is also concerned with a recording medium in which a program implementing the above data structure identifying method is recorded. Details of certain features of the present invention are described in European Patent Application No. 0,753,811 A1 entitled in "Data processing method and device" and filed by the same assignee on Jul. 12, 1996 claiming a Convention Priority on JP 178625/95, filed Jul. 7, 1997, the complete disclosure of which is hereby incorporated herein by reference.

2. Description of the Related Art

For controlling various types of apparatuses and performing data communications between the apparatuses, software is becoming essential and the role of software is increasingly important. In all the software programs, and in particular, in most of the software programs to implement a complicated system, processing is simply described by handling a plurality of data items as a unit. Such a unit of data items is generally referred to as "an object" or "a data structure".

In a software program, an object or a data structure is provided with a name and is identified by the name. In programming languages, such as C and C++, the name provided for an object or a data structure represents a function, a type, a class, or a variable.

However, the name defined by a programming language is used only in a region of the program text, which is referred to as "scope", and is insufficient for representing an object or a data structure in a larger scale software program. Accordingly, most software programs cannot be implemented by a single program text and require a plurality of program texts.

There are increasingly a number of software programs which have been separately developed by a plurality of engineers and achieve a system by communicating and operating in cooperation with the programs.

Generally, a software module providing a certain service is referred to as "a server", while a software module using the service is referred to as "a client". In this case, the client can be considered as an identifier user, while the server can be regarded to include an identifier manager.

The definitions of the data structure and the data identifier are as follows.

The data structure specified in the following description cannot be directly accessed by the clients. In the relationship between an operating system (OS) and an application, for example, the data structure for which the OS manages calculation resources is not directly accessed by the application. This is because if the application is allowed to access the data structure within the OS, there is a possibility of destroying the OS.

Similarly, in regard to the application, in the relationship between the client and the server, the client is prohibited to directly access the data structure of the server, particularly when an object-oriented technique is applied to the application. The reason is as follows. According to the object-oriented technique, data managed by an object is accessed only by a method for processing the data or an application program interface (API), thereby offering advantages such as ease of programming and ensuring maintainability and safety.

Under the aforementioned condition, the basic functions, such as communications and cooperative operations between software programs, are supported by the OS. In an application program run on the OS, instead of using a name provided by a programming language, the use of an identifier (ID) is becoming popular for identifying an object or a data structure.

The identifier is generally treated in program as a value of an integer type or a value of specific type defined for an identifier. The value of the identifier is determined by the OS. The identifiers are required to distinguish between the objects or the data structures, and thus, each identifier has a unique value as viewed from the overall system. Accordingly, the number of bits and the content expressing the identifier, which are referred to as "a format", determine the performance of the system or the required memory size.

FIG. 25A illustrates an example of the format of an identifier that uses a memory address. For example, in a memory, such as a Transfer Look aside Buffer (TLB), for use in a microprocessor which is not provided with a memory management mechanism, all the possible address values within the system are unique. Accordingly, when a data structure is created, as shown in FIG. 26A, the memory address at which the data structure is arranged is used, as illustrated in FIG. 26B, as an identifier corresponding to the data structure.

The format of the above-mentioned identifier requires a sufficient number of bits needed for representing the address corresponding to the data structure. In this format, the address of the data structure can be readily recognized by the value of the identifier. This is very effective for a system which immediately needs to recognize the content of the data structure.

However, if there is a possibility of dynamically generating or erasing the data structure, the value of the identifier is likely to change and is not fixed over time. Accordingly, if it is possible that the data structure be dynamically created or destroyed while the system is operating and that the same address be reused, the address value cannot be used for the identifier.

Another example of the format of an identifier using a time stamp is shown in FIG. 25B.

The number of bits required for this format is determined by the time needed for generating or erasing the data structure and the time during which the identifier is valid. For example, if it is assumed that the time needed for creating a certain structure is 10 microseconds and the system should continue to run for approximately 20 years, 46 bits are required. Namely, since $2^{46}=7.04 \times 10^{13}$, the system can be operated for 195,465.73 hours or 22.31 years.

According to the above type of format, the value of the identifier is unique on a time axis merely by issuing time stamps in sufficiently small units, thereby making it possible to distinguish between data structures by the identifier.

However, in order to check the data structure, the address value should be searched, which further requires additional processing, such as the use of a Hash table, thereby failing to exhibit the performance of this type of format. Additionally, if a sufficient number of bits are not used, a time stamp for the required number of years cannot be expressed.

As still another example of the format of an identifier which provides a unique value on a time axis, a counter may be used.

In this method, every time a data structure defined by an identifier is created or destroyed, the counter value may be incremented. In this method, as well as in the previous method, however, additional processing is required for searching the address value in order to check the data structure from the value of the identifier.

According to the above known formats of the identifier, i.e., the format in which an address value is combined with a time stamp or a counter, a great number of bits are required. In a 32-bit addressing processor, for example, which is currently used as a standard processor, 32 bits are required for an address value, and 32 bits (or 64 bits) are needed for a time stamp, thus resulting in a total of 64 bits (or 96 bits).

A sufficient memory area is not always ensured for software programs which are used by being integrated into various apparatuses. It is thus desirable that memory be used as little as possible by the above types of software programs, and the format of an identifier requiring a smaller number of bits is thus demanded. With a smaller number of bits, it is possible to decrease the cost required for performing comparison operations on identifiers or for copying the values of identifiers, thereby improving the performance of the entire system.

However, the performance of the system may not be enhanced merely by decreasing the number of bits. As discussed above, for example, the format of an identifier using only a time stamp or a counter requires additional processing, such as the use of a Hash table, and accordingly, the performance may be lower than the format of an identifier using address values. Moreover, considering the processor addressing method, a smaller number of bits does not sometimes make sense. In the 32-bit addressing processor, for example, since most calculations are performed in units of 32 bits, it is suitable to set the number of bits required for the format of an identifier to be 32 bits.

Nowadays, systems are becoming complicated, for example, a system is connected to a network to perform communications between the individual apparatuses and the system configuration dynamically changes. In such a system, the requirements for the format of an identifier vary among the apparatuses. Accordingly, there is a demand for a data structure identifying method using an expandable identifier that is suitably used in a variety of apparatuses having different demands and in communications performed between such apparatuses.

SUMMARY OF THE INVENTION

Accordingly, in order to solve the above problems, it is an object of the present invention to provide a data structure identifying method in which only a small number of bits are required and in which a high level of system performance can be maintained.

It is another object of the present invention to provide a data structure identifying method using an identifier that is suitably used in an expandable system.

It is still another object of the present invention to provide a recording medium in which a program implementing the aforementioned data structure identifying method is recorded.

In order to achieve the above object, according to one aspect of the present invention, there is provided a data structure identifying method in which objects and/or data structures are differentiated by using an identifier. The identifier includes an index corresponding to an address used for checking the object and/or the data structure.

According to another aspect of the present invention, there is provided a data structure identifying method in which objects and/or data structures are differentiated by using an identifier. The identifier includes an index corresponding to an address used for checking the object and/or the data structure. The identifier has a format determining portion for determining a format of the identifier.

With the above arrangements, it is possible to provide a data structure identifying method using an identifier applicable to an expandable system in which a required number of bits can be reduced and a high level of the system performance can be maintained.

According to still another aspect of the present invention, there is provided a recording medium in which a program for differentiating between objects and/or data structures by using an identifier is recorded. The identifier includes an index corresponding to an address for checking the object and/or the data structure.

According to a further aspect of the present invention, there is provided a recording medium in which a program for differentiating between objects and/or data structures by using an identifier is recorded. The identifier includes an index corresponding to an address for checking the object and/or the data structure and a format determining portion for determining a format of the identifier.

With the above arrangements, it is possible to provide a recording medium in which a program implementing a data structure identifying method using an identifier applicable to an expandable system is recorded. In this method, a required number of bits can be reduced and a high level of the system performance can be maintained.

BRIEF DESCRIPTION OF THE DRAWINGS

FIG. 4 illustrates an example of a table "StructEntryTable";

FIG. 5 illustrates the relationship between the data structure "Struct" arranged in a memory and the address of the table "StructEntryTable";

FIG. 6 illustrates the structure of a list "free StructID list";

FIG. 13, which is comprised of FIGS. 13A and 13B, illustrates an identifier format for use in a data structure identifying method according to the present invention;

DESCRIPTION OF THE PREFERRED EMBODIMENTS

Preferred embodiments of the present invention are now described with reference to the drawings.

In the following description, it is assumed that the invention is applied to an object-oriented operating system (OS).

[1]

Prior to a specific description of the preferred embodiments of the present invention, the object-oriented OS to which the present invention is applied is explained below.

(1) Object-oriented OS

The object-oriented OS incorporating the present invention has been developed by forming a plurality of functions into modules according to an object-oriented technique. More specifically, the OS which is referred to as "Aperios" (trademark) may be used.

The above-described object-oriented OS is characterized by the base/meta separation technique and the nano-kernel technique, and a plurality of virtual operating systems can be provided simultaneously. The environment of a virtual OS is provided upon a demand from an application and is particularly referred to as "metaSpace" in the above object-oriented OS.

The metaSpace is also expressed by the term "environment" in the specification and the drawings of Japanese Patent Application No. 9-92446, which has been previously filed by the same assignee of this invention.

In the specification and the drawings of the above application, a metaSpace for supporting concurrent object-oriented programming, which is referred to as "metaSpace for Concurrent Object-Oriented Programming (mCOOP)", is described. In the mCOOP, the functions possessed by an application are formed into modules in units of objects. An application is formed of a single or a plurality of objects, which communicate with each other through message passing.

(2) Determining Format of Identifier by Identifier Manager

A specific description is now given below of the preferred embodiments of the present invention for use in the object-oriented OS including an identifier manager.

Figure 1:
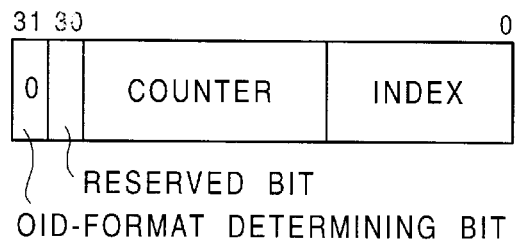
FIG. 1 illustrates the format of a 32-bit object identifier (OID)
Figure 2:
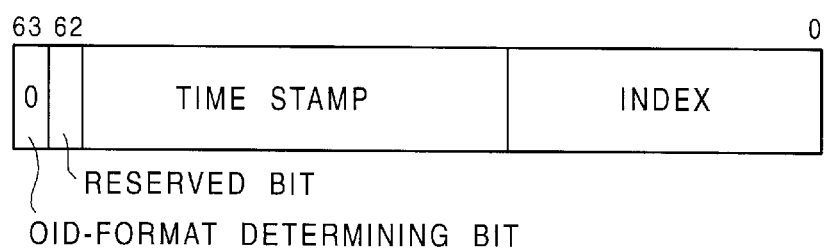
FIG. 2 illustrates the format of a 64-bit object identifier (OID)

FIGS. 1 and 2 respectively illustrate the formats of a 32-bit object identifier (OID) and a 64-bit object identifier (OID). Bit 31 of the identifier shown in FIG. 1 and bit 63 of the identifier shown in FIG. 2 are bits for determining the OID format. Bit 30 of the identifier illustrated in FIG. 1 and bit 62 of the identifier illustrated in FIG. 2 serve as reserved bits, which are used for identifying the presence or the absence of a network address that will be added to the OID format. Alternatively, the reserved bit may be used for making an additional determination even if a network address is not added to the OID format.

(2-1) Creating or Destroying Data Structure and Identifier

The creation or the destruction of a data structure and the corresponding identifier is more specifically described below. Although various methods may be considered to create and destroy a data structure and the corresponding identifier, a method used in an object-oriented OS is described as an example.

Figure 3:
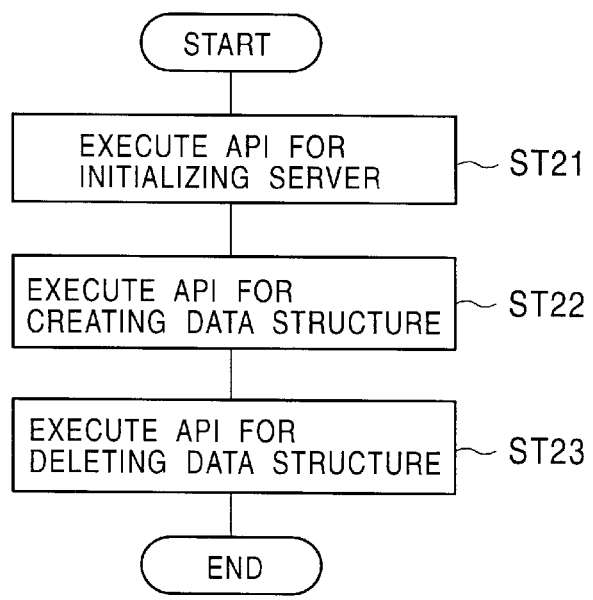
FIG. 3 is a flow chart illustrating the basic procedure for creating/destroying an identifier.

FIG. 3 is a flow chart illustrating a basic procedure for creating and destroying an identifier. In step ST21, an API for initializing a server is first executed. At this time, a data structure identifier manager, which will be discussed later, is also initialized. In step ST22, an API for creating a data structure is executed, and in step ST23, an API for destroying the data structure is then executed. After performing initialization as discussed above, a data structure and the corresponding identifier are created or destroyed according to a request from an application. The creation or the destruction of the identifier is managed by an identifier manager, which is an object of the OS.

The identifier manager and the initialization of the unit are now described in detail below. In the following description, the data structure and the corresponding identifier are respectively referred to as "Struct" and "StructID" for convenience.

(2-2) Identifier Manager

The identifier manager has a table "StructEntryTable" for managing the values of "StructID"s and also has a "free StructID list" for sequentially storing indexes of unoccupied "StructID"s.

FIG. 4 illustrates an example of the table "StructEntryTable". "SructEntryTable" is an array of a combination of the address of the "Struct"s arranged in a memory and the counter. The size of the array is equal to the maximum number of "Struct"s to be handled by the system.

FIG. 5 illustrates the relationship between the "Struct"s arranged in the memory and the address, which is an element of the "StructEntryTable".

FIG. 6 illustrates the structure of "free StructID list". As discussed above, this list is used for managing the indexes of unoccupied "StructID"s.

(2-3) Initializing Identifier Manager

The initialization of the aforementioned identifier manager is now discussed.

Figure 7:
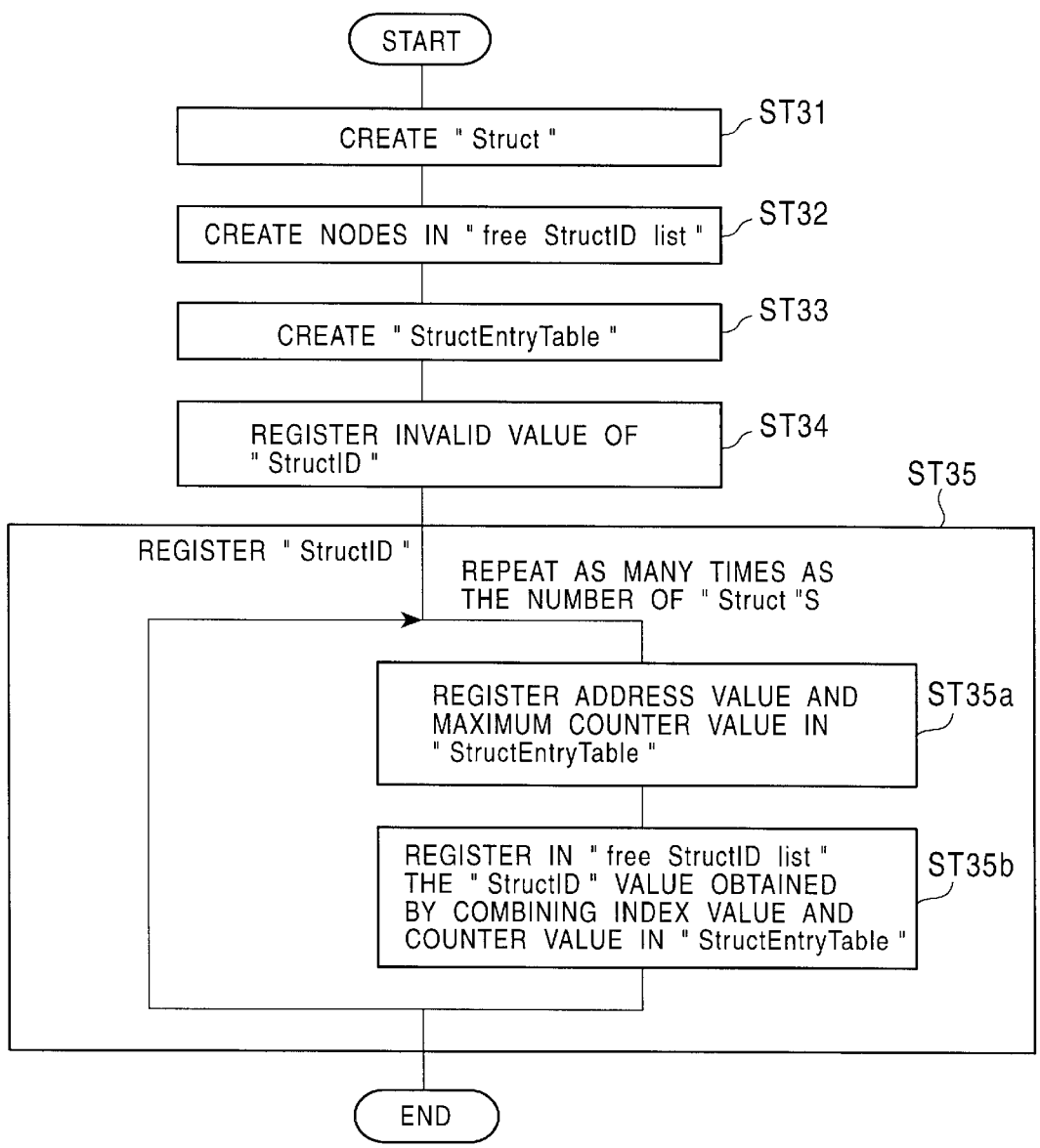
FIG. 7 is a flow chart illustrating the basic procedure for initializing an identifier manager.

FIG. 7 is a flow chart illustrating the basic procedure for initializing the identifier manager.

In step ST31, a required number of "Struct"s is reserved in the memory. The state of the memory is shown in FIG. 5. In step ST32, the same number of nodes included in "free StructID list" as the number of "Struct"s are then reserved in the memory. Subsequently, in step ST33, "StructEntryTable" for managing "Struct" and "StructID" is reserved in the memory as an array. In this case, the number of entries in the "StructEntryTable" is equal to the number obtained by adding one to the number of "Struct"s.

Thereafter, in step ST34, the index "0" of the "StructEntryTable" is registered as an invalid value of the "StructID".

Namely, in the index "0", the address value of the "StructEntryTable" is set to be "0x00000000" (NULL), and the counter value is set to be "0".

In step ST35, "Struct"s and entries of the "StructEntryTable" corresponding to the valid identifiers "StructID"s (which are other than the invalid value of the "StructID" set above) are then set and registered. More specifically, in step ST35, an initial value is first set in one of the entries other than the entry corresponding to the index "0" of "StructEntryTable". In step ST35a, the address value of the previously created "Struct" is then registered as the address of the "StructEntryTable", and the maximum of the valid counter value is registered in the counter. Subsequently, in step ST35b, the value of the "StructID" is generated by combining the index value and the counter value and is set in the "free StructID list". Step StT35 is repeated as many times as the number of "Struct"s, and the initializing operation is completed.

(2-4) Creating Identifier by Identifier Manager

A description is now given of the creation of a data structure and the corresponding identifier by an identifier manager provided for a server. An example in which an identifier is practically created is discussed later.

Figure 8:
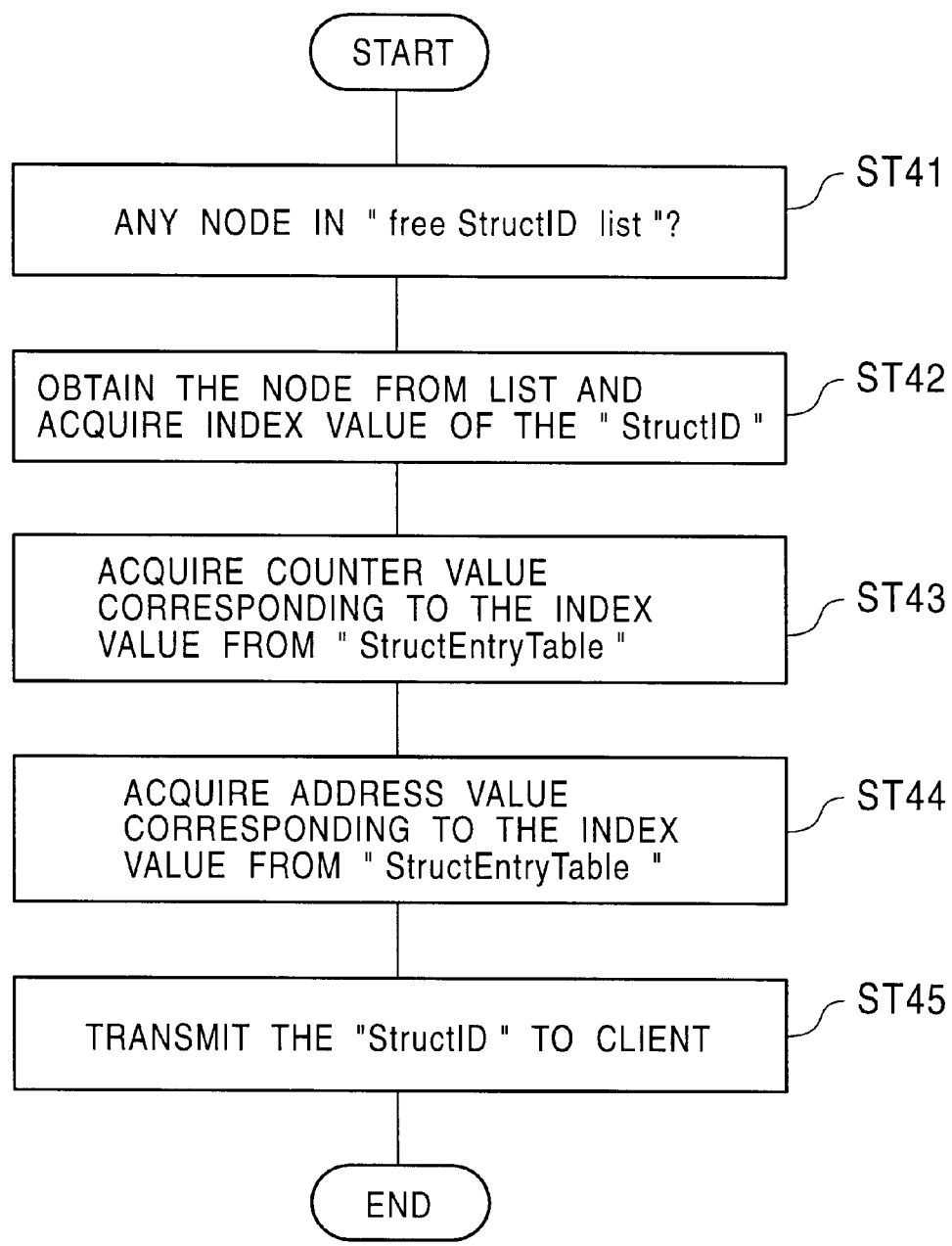
FIG. 8 is a flow chart illustrating the basic procedure for creating an identifier by the identifier manager.

FIG. 8 is a flow chart illustrating the basic procedure for creating an identifier by the above-described identifier manager.

It is first checked in step ST41 whether there is any node in "free StructID list". If there is an available node, the "StructID" of such a node is reserved as an ID to be issued and is erased from the list. If there is no node in the list, the server provided with the identifier manager informs the client that there is no free node.

In step ST42, an index value, which is one of the elements of the above "StructID", is then obtained.

Subsequently, in step ST43, the counter value corresponding to the index value is acquired from "StructEntryTable". The counter value is set in the above "StructID", thereby making the "StructID" value valid. Namely, the counter value is combined with the index value, which is then used as "StructID".

Thereafter, in step ST44, the address value registered in the entry corresponding to the index value of the above "StructID" is obtained from "StructEntryTable". The address value represents the address of the "Struct" corresponding to the above "StructID", thereby making it possible to directly access (see) the "Struct" in the memory. Attributes to be set in the "Struct" are thus determined.

Finally, in step ST45, the valid "StructID" obtained by the above procedure is transmitted to the client.

It should be noted that the order of steps ST43 and ST44 may be reversed.

(2-5) Checking Identifier by Identifier Manager

Checking of an identifier made by the identifier manager provided for a server is now discussed.

Checking of an identifier becomes necessary in the following situation when a client accesses a service provided by the server. To explicitly or implicitly access the data structure, the identifier may be used as an argument for using the service. Another occasion to check an identifier is to determine whether the identifier and the related data structure to be destroyed are valid.

Figure 9:
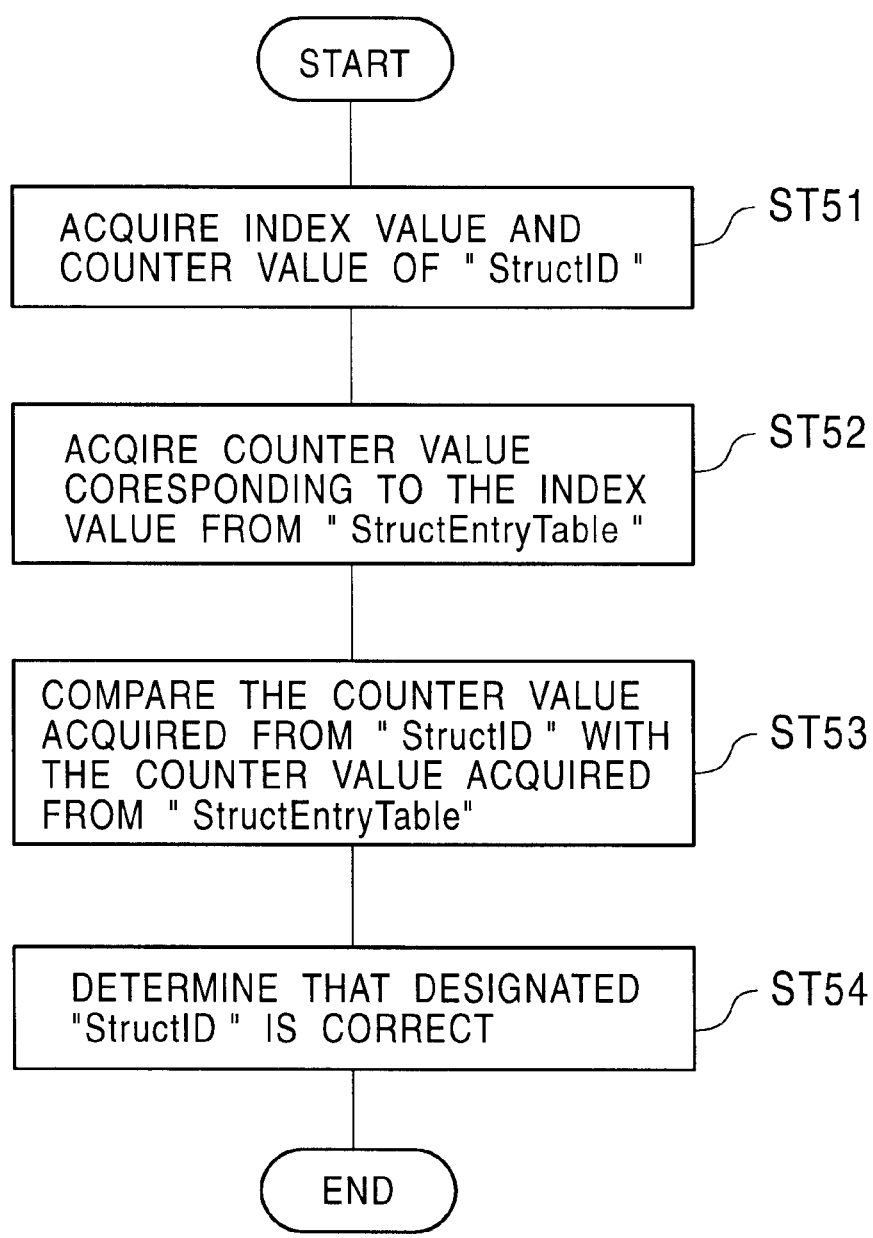
FIG. 9 is a flow chart illustrating the basic procedure for checking an identifier by the identifier manager.

FIG. 9 is a flow chart illustrating the basic procedure for checking an identifier by the identifier manager.

It is first checked in step ST51 that the designated "StructID" is valid, and then, the index value and the counter value of the "StructID" are obtained. In step ST52, the counter value corresponding to the above index value is then acquired from the "StructEntryTable".

Subsequently, in step ST53, the counter value (which forms the "StructID") directly obtained from the above-described "StructID" is compared with the counter value acquired by using the index value in the "StructEntryTable".

If the two counter values are equal to each other, it is determined in step ST54 that the value of the "StructID" designated by the client is a value usable by the system. It is thus ensured that the client can be permitted to proceed with accessing the service provided by the server.

Conversely, if the two counter values do not coincide with each other, the value of the "StructID" is not usable by the system (not shown). In this case, the identifier manager reports to the client through the server that the "StructID" is not usable or that the "StructID" has already been used and is no longer valid.

(2-6) Destroying Identifier and Data Structure

A description is now given of the destruction of an identifier and a data structure by the identifier manager provided for a server.

Figure 10:
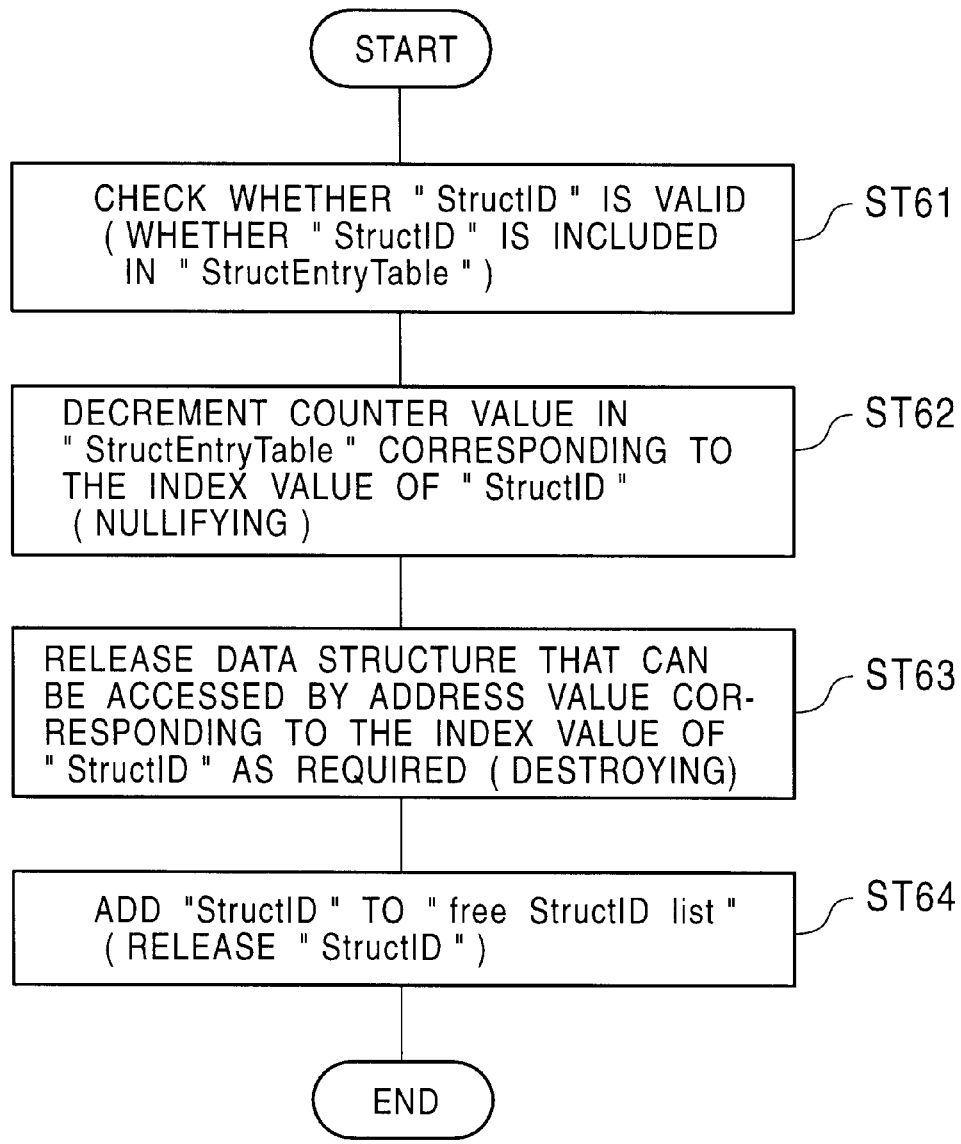
FIG. 10 is a flow chart illustrating the basic procedure for destroying an identifier and a data structure by the identifier manager.

FIG. 10 is a flow chart illustrating the basic procedure for destroying an identifier and a data structure by the identifier manager.

A check is first made in step ST61 of whether the "StructID" is valid. To execute the processing in this step, the processing shown in FIG. 9 may be used.

In step ST62, the counter value in "StructEntryTable" corresponding to the index value of the "StructID" to be destroyed is decremented. Accordingly, even if the destroyed or nullified "StructID" is erroneously reused, it can be determined that the "StructID" is not usable by the system, since the counter value of the "StructID" differs from that in "StructEntryTable".

Thereafter, in step ST63, the data structure that can be accessed by the address value corresponding to the index value of the "StructID" is released from the memory as required.

However, in apparatuses into which the aforementioned object-oriented OS is integrated, the data structure is often reused, and in practice, in the above-mentioned "mCOOP message passing" or a graphics driver, which will be discussed later, the data structure is reused without being released from the memory.

In step ST64, the "StructID" is added to "free StructID list", and the process of destroying the identifier and the data structure is then completed.

Figure 11:
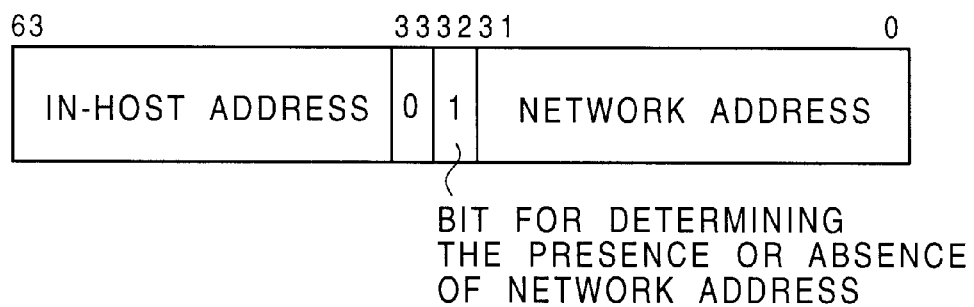
FIG. 11 illustrates an example of a simple object identifier "OID" format formed by a combination of an in-host address and a network address.

FIG. 11 illustrates an example of a simple object identifier ("OID") format formed by combining an in-host address and a network address.

Unlike the "OID" format shown in FIG. 1, the format illustrated in FIG. 11 does not use a combination of the index and the counter, but is provided with a bit for determining the identifier format. Bit 32 of the identifier is used as a bit for determining the presence or the absence of a network address. This is due to a benefit from the following fact. When the upper 32 bits of a 64-bit "OID" are assigned to an in-host address, the lowest two bits of the upper 32 bits are "0" in most processor addressing methods.

(3) Data Structure Identifier in "mCOOP"

In the aforementioned "mCOOP", the data structure identifiers for use in the present invention include:

Object Identifier (OID)

Result (R) Box Identifier (RID)

Event Identifier (EventID)

The "OID" is used for specifying an object to be addressed when sending a message from an object used in an application. An OS recognizes the position of the destination object by using the "OID" to deliver the message. The "RBox" or an event is a data structure that assists message passing.

[2]

A description is now given of a first embodiment of the data structure identifying method according to the present invention.

In the following description, it is assumed that the aforementioned object-oriented OS is used, and the RBox identifier "RID" is first discussed in detail. Then, a detailed description is given of a data structure identifying method in which only a small number of bits are required and in which a high level of system performance can be maintained.

(1) Basic Concept of the Present Invention

Prior to a specific description of the first embodiment of the present invention, the format of an identifier formed as a combination of the address and the time stamp is discussed below.

Figure 12:
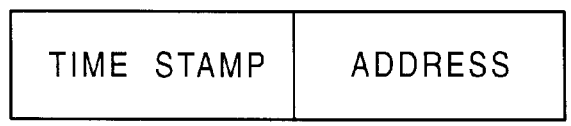
FIG. 12 illustrates an example of an identifier format formed by a combination of a memory address at which the data structure is arranged and a time stamp.

FIG. 12 illustrates an example of the format of an identifier formed by combining a memory address at which a data structure is arranged and a time stamp.

In this format, the data structure corresponding to the identifier can be easily checked by the address value. Also, a unique value on a time axis (time stamp) is included in this format. Thus, the problems encountered by the known format using only the address value can be solved.

According to the data structure identifying method of the first embodiment of the present invention described below, a table for managing the memory address at which the data structure is arranged is created in a portion for managing the identifiers, for example, within the OS.

Figures 13A, 13B:
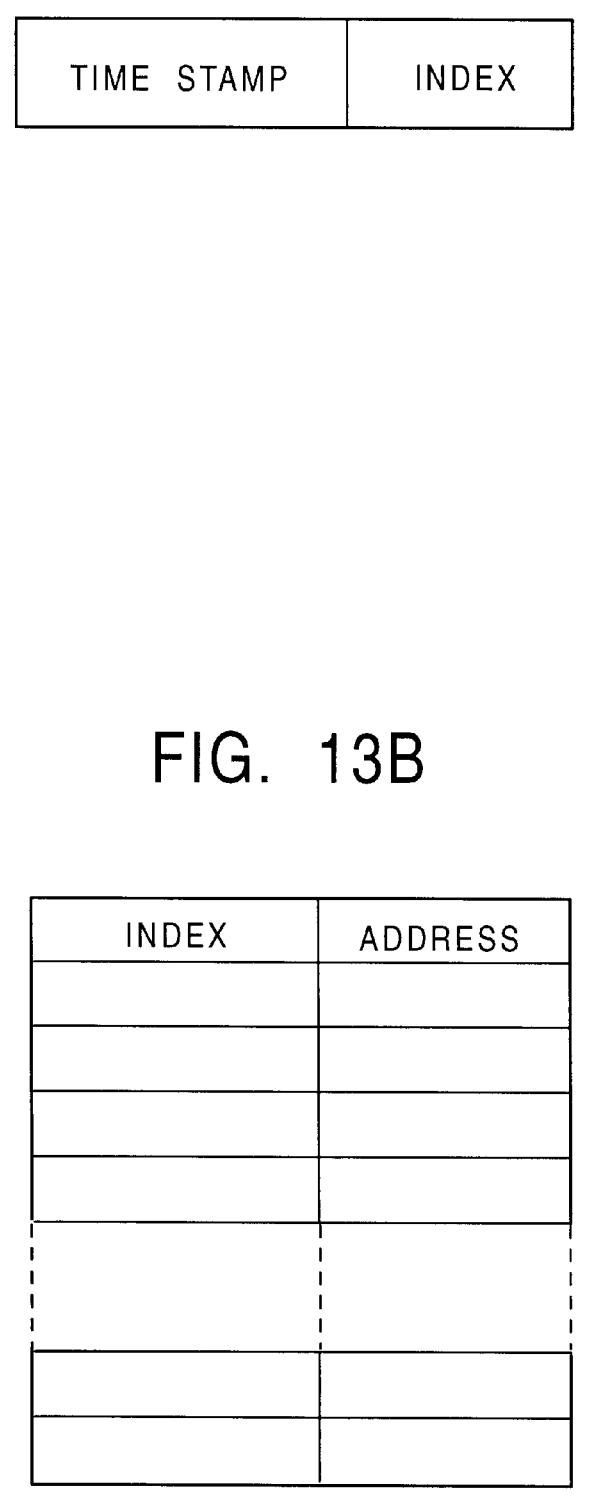

More specifically, instead of the address value, the index contained in the above-mentioned table is used, as shown in FIG. 13A, as an element forming the identifier, thereby reducing the required number of bits for describing the address value.

Figures 25A, 25B, 26A, 26B:
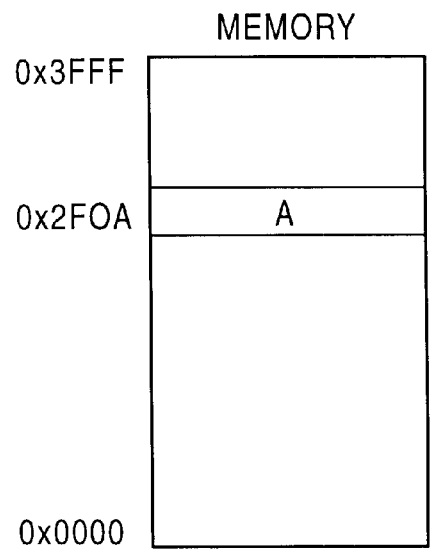
FIG. 25, which is comprised of FIGS. 25A and 25B, illustrates an example of a known identifier format.
FIG. 26, which is comprised of FIGS. 26A and 26B, illustrates a known identifier format using as an identifier a memory address at which the data structure is arranged.

FIG. 13B illustrates an example of a table which indicates the relationship of the above index to the address. To ensure that the identifier can be unique on a time axis, a combination of the address and the time stamp shown in FIG. 25B or the counter value is employed. The client (identifier user) is required to utilize the identifier to receive a service provided by the server. Namely, it is sometimes necessary to create a data structure to receive a service, in which case, the identifier is required for identifying the data structure.

Figure 14:
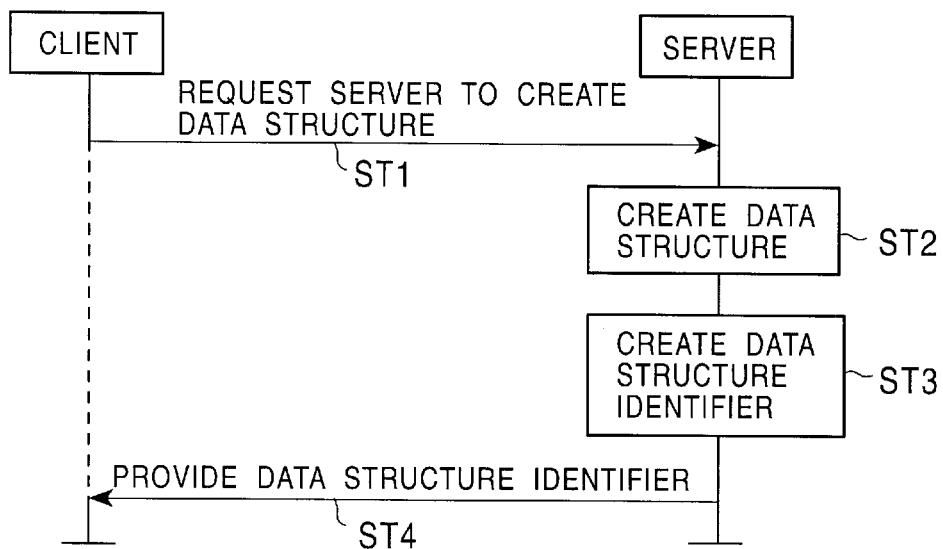
FIG. 14 is a flow chart illustrating the basic procedure for creating a data structure.

FIG. 14 is a flow chart illustrating the basic procedure for creating a data structure and the corresponding identifier.

In step ST1, the client requests the server to create a data structure. In step ST2, the server then creates the data structure in accordance with the content of the request, and creates its identifier in step ST3. In creating the identifier, as discussed above, the memory address at which the data structure is arranged is utilized, which will be described later in detail. In step ST4, the server provides the client with the identifier of the data structure. The processing is then completed. If the client no longer requires the data structure and the corresponding identifier, they are destroyed.

Figure 15:
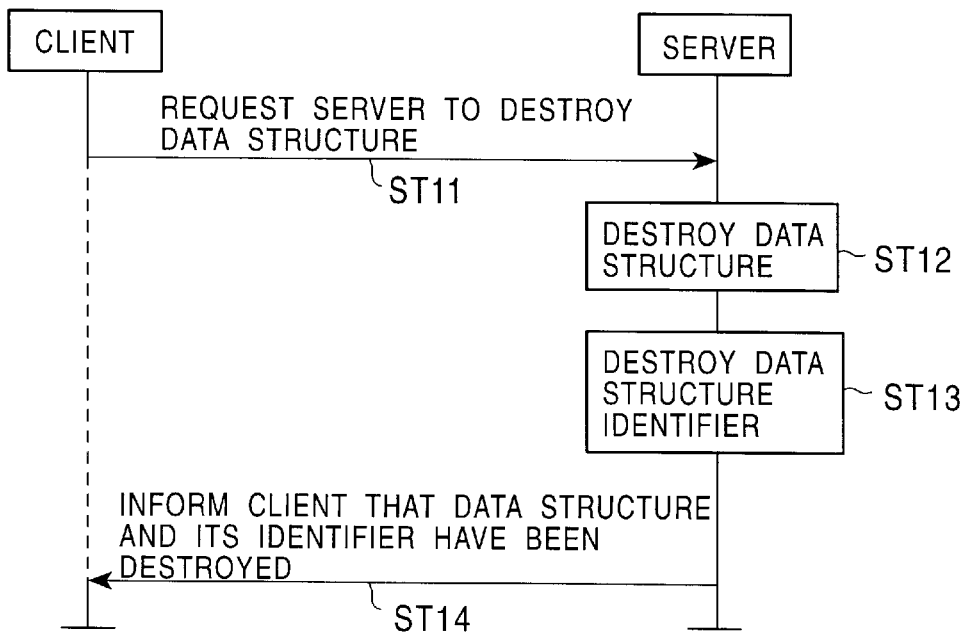
FIG. 15 is a flow chart illustrating the basic procedure for destroying a data structure and the corresponding identifier.

FIG. 15 is a flow chart illustrating the basic procedure for destroying a data structure and the corresponding identifier.

In step ST11, the client requests the server to destroy the data structure. In this case, the service (API) provided by the server is not necessarily meant to be for destroying the data structure and the corresponding identifier.

The server then destroys the data structure in step ST12, and destroys its identifier in step ST13. It should be noted that the order of steps ST12 and ST13 (destruction of the data structure and that of its identifier) may be reversed. In step ST14, the server informs the client as required that the data structure and the corresponding identifier have been destroyed. The processing is then completed.

Before the processes of creating or destroying the identifier illustrated in FIG. 14 or 15, the identifier manager, which serves as an object within the server, is initialized.

(2) Specifications for "mCOOP Message Passing" and "RID"

The aforementioned "RBox" is a data structure required for the basic type (standard method) of "mCOOP" message passing. The basic type of "mCOOP" message passing is a type using "Future". As another example of message passing using "Future", "mLocal message passing" and a method for implementing such message passing are described in detail in the specification and the drawings of Japanese Patent Application No. 9-92446 previously filed by the same assignee of this invention.

(3) API for "mCOOP Message Passing"

In "mCOOP", the following three methods are provided as APIs for "mCOOP message passing".

sError SendWithRBox(in OID destination, in Selector method, in any msg, in size_t sizeOfMsg, out RID rBoxID)

sError Receive(in RID rBoxID, in any resultMsg, in size_t sizeOfResultMsg)

sError Reply(in resultMsg, in size_t sizeOfResultMsg)

The following API for searching an object is further provided to assist message passing. sError Find(in String name, out OID objectID)

(3-1) Factors in Common with the above APIs

The factors in common with the above APIs are discussed below.

The aforementioned APIs are described by an Interface Define Language (IDL), and "in" and "out" added before an argument indicate "input argument" and "output argument", respectively. For example, the first argument "name" in API "Find" means that the argument "name" of the type "String" is input, and the second argument "objectID" means that the argument "objectID" of the type "OID" is output.

(3-2) Specifications for the individual APIs

The specifications for the above individual APIs are discussed below.

In the method "SendWithRBox", transmitted to an object designated by the argument "destination" is a message "msg" for starting a method indicated by the argument "method" of the above object, thereby obtaining the argument "rBoxID". After transmitting the message, the transmitter (the object which has issued the method "SendWithRBox") is able to restart executing. The "sizeOfMsg" represents an argument for designating the size in bytes of a message to be transmitted.

"Receive" is a method for receiving a result message (response). The object which has issued the method "Receive" specifies by using the argument "rBoxID" which transmitted message is to be used to receive a result. The "resultMsg" is used for specifying the region into which the result message is written. The "sizeOfResultMsg" indicates an argument for designating the size in bytes of the result message to be received.

"Reply" is a method for sending a result as a message "resultMsg" to the transmitter from the object which has received the message.

(4) Basic Type of "mCOOP Message Passing"

A description is now given of the basic type of "mCOOP message passing" implemented by a combination of the above-described APIs.

Figure 16:
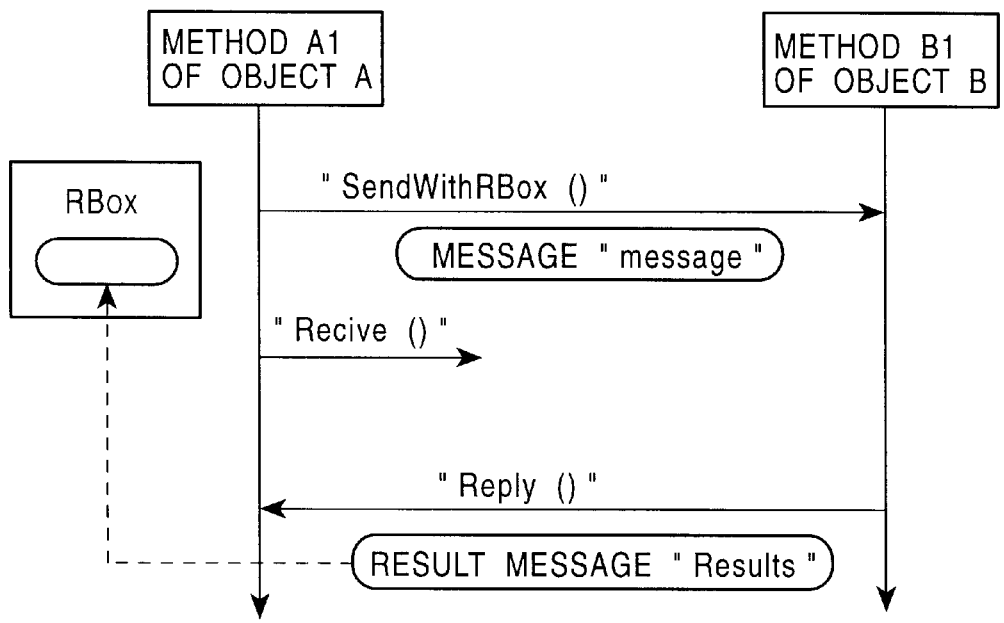
FIG. 16 illustrates the basic type of "mCOOP message passing" by using the methods "SendWithRBox", "Receive", and "Reply"

FIG. 16 illustrates the basic type of "mCOOP message passing" using the aforementioned methods "SendWithRBox", "Receive", and "Reply". In FIG. 16, A and B indicate objects, and A1 and B1 represent methods of the respective objects.

The object "A" first provides the object "B", the method "B1", the "message", and the size of the "message" as arguments, thereby issuing the method "SendWithRBox". The message is then transmitted to the object "B", which is then able to start the method B1. Simultaneously, the "RBox" is created within the OS in response to the message passing, and the object A obtains the value of the identifier "RID" for identifying the "RBox".

It is necessary that the message include the content required for performing a certain calculation by the method B1. The object B1 then proceeds with a calculation to obtain a result. Accordingly, the object B1 issues the method "Reply" by providing the message "Results" and its size as arguments and finally transmits the result message to the object A.

The object A is able to restart the calculation after issuing the method "SendWithRBox". The object A issues the method "Receive" when it requires results in response to the message transmitted to the object B. In this case, the object A specifies by using the RBox identifier "RID" which transmitted message is to be used to receive a result.

Since the object A and the object B are able to concurrently execute processing, the method "Receive" may be issued by the object A before or after the method "Reply" is issued by the object B. If the method "Receive" is issued before the method "Reply" is issued, the object A enters the standby position until the method "Reply" is issued (upon issuing the "Reply", the object A is able to immediately receive the result). Conversely, if the method "Reply" is issued prior to the method "Receive", the "Results" are stored in the "RBox", and the object A is able to obtain the results stored in the "RBox" when the method "Receive" is issued.

(5) Requirements and Format of "RID" and its Implementing Method

The "RBox" is created or destroyed every time the basic type of the "mCOOP message passing" is used. The "RBox" is a data structure having attributes, such as a flag representing a region where a result message is stored, a flag indicating whether a result message has been delivered, and a flag indicating whether there is any object in the standby position to wait for the arrival of a result message in the "RBox".

In the "mCOOP", since the implementation of object interaction is totally dependent on message passing, the "RID" is used very frequently. Therefore, considering that the data structure is created or destroyed very frequently, it is not desirable that the "RID" format is formed only by the address values.

In light of the above viewpoint, the "RID" format is required to include an element which ensures that the "RID" can be unique on a time axis.

The performance of currently available processors reveals that the "RBox" may be created or destroyed in the smallest units of a few microseconds, and in even smaller time units in the future. In this situation, the time stamp is not preferable as an element to guarantee that the "RID" can be unique on a time axis.

One of the reasons for the above is that the number of required bits is increased if the "RBox" is created or destroyed in a very short period. Another reason is that it is possible that the "RBox" be not created or destroyed for a long period, in which case, a greater number of bits are wasted for unnecessary time stamps.

To overcome the above drawbacks, a counter for counting time (logical time) is employed in creating or destroying the "RBox".

As discussed above, the "RID" is an identifier (ID) for identifying the "RBox" used by an application object. Since the application object is not required to check the data within the OS, it is not necessary, as viewed from the application object, that the "RID" include the memory address at which the "RBox" is arranged. On the other hand, the "RID" is also used by the OS, which is required to speedily check the "RBox" from the "RID". Consequently, as discussed above, the index is used as an element of the "RID", and a table is provided within the OS so that the OS can check the address value of the "RBox" from the index. This eliminates the necessity of performing a table search, which would otherwise increase the cost.

Figure 17:
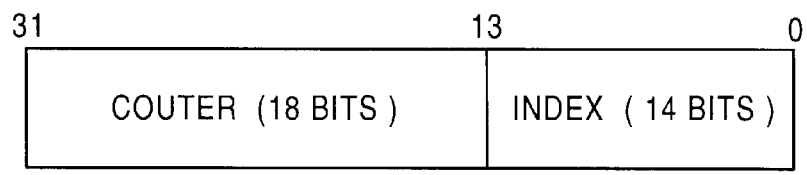
FIG. 17 illustrates an example of a RBox identifier "RID" format.

FIG. 17 illustrates an example of the "RID" format in the object-oriented OS.

The entire format is formed of 32 bits, in which 18 bits are allocated to the counter portion for storing counter values and 14 bits are assigned to the index portion.

In this format, if one index is assigned to one "RBox", a maximum of $2^{14}$=16,384 "RBox"s can be managed, and $2^{18}$=262,144 counter values may be assigned to one "RBox" or one index. A specific example is described in detail later.

The range of the index values which determines the maximum number of the concurrent "RBox"s and the unique value of the identifier on a time axis may vary according to the requirements of the system. In this example, the ratio of the bits assigned to the counter portion to those assigned to the index portion is not specified, which will be described later.

The value of the "RID" should be issued (determined) by the OS, which requires the use of a suitable API. If the "RID" is arranged in a memory without using such an API, it is determined to be invalid. Such an invalid value is defined to be "0" in the object-oriented OS. Namely, both the counter value and the index value are "0". When the invalid value is determined to be "0", comparison calculations can be performed faster than the format in which the other values are defined to be invalid. Yet, the invalid value of the "RID" may be set at a number other than "0" while sufficiently considering the performance of the processor.

It should be noted that there is a difference between the "RID" being unusable by the system at one point and the "RID" being invalid. A value "RID" is no longer usable by the system once the corresponding "RBox" is used. The counter value, which is an element forming the "RID", is used for checking the validity of the "RID" mentioned above on a time axis. Accordingly, even if the "RID" is valid, it may be unusable by the system.

(6) Creating or Destroying "RID"

The method for implementing the aforementioned "mCOOP message passing" is now described in detail in connection with the creation and destruction of "RID"s.

The function "mCOOP message passing" is implemented by a combination of a plurality of objects. The main object is the object "mCOOPMailer", which includes methods for implementing the APIs for "mCOOP message passing" and methods for performing initialization. For processing the above methods, the "mCOOPMailer" transfers messages, controls the execution states of the objects, and manages the "RBox" and the corresponding "RID".

The methods for implementing the APIs for "mCOOP message passing" include "SendWithRBox", "Receive", and "Reply", as discussed above. Upon issuing the method "SendWithRBox", "Receive", or "Reply", an application object running on a metaSpace "mCOOP" starts to execute the corresponding method.

The object "mCOOPMailer" executes processing for initialization when the system is started, and simultaneously, it reserves a data region for the "RBox".

(7) Data Structure Concerning "RBox" and "RID"

A description is now given of a data structure concerning the "RBox" and the corresponding "RID" possessed by the object "mCOOPMailer".

The object "mCOOPMailer" has a table "RBoxEntryTable" representing the relationship of the index value, which is an element for forming the "RID", to the address of the "RBox" and the counter value.

Figures 18, 19:
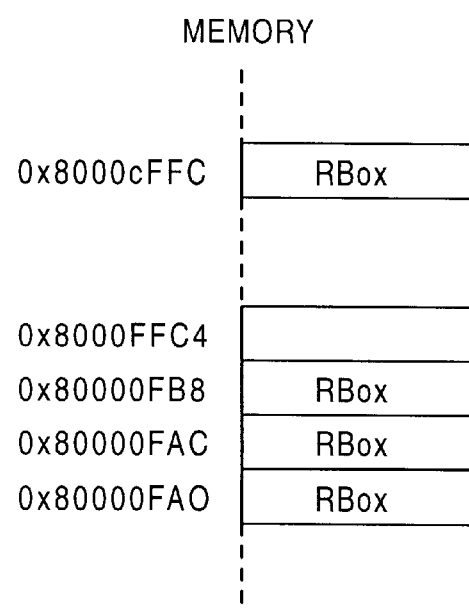
FIG. 18 illustrates an example of a table "RBoxEntryTable"
FIG. 19 illustrates the relationship between the RBox identifier "RBox" arranged in a memory and the address of the table "RBoxEntryTable"

FIG. 18 illustrates an example of the table "RBoxEntryTable". In this table, the counter value indicates a valid counter value in relation to the index value of a "RID". In this example, when both index value and address are "0" the counter value is set to be invalid, i.e., "0x00000000", as discussed above. The address at which the "RBox" is arranged in memory is set as the address portion of the "RBoxEntryTable". This makes it possible to speedily check the "RBox" corresponding to the index value of a "RID", as shown in FIG. 19.

In addition to the "RBoxEntryTable", the object "mCOOPMailer" has a "free RID list" for sequentially storing index values of the usable "RID"s and an "unavailable RID list" for sequentially storing the index values that are being used.

Figure 20:
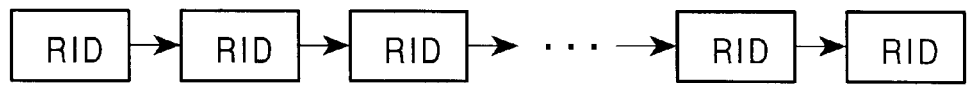
FIG. 20 schematically illustrates the "free RID list"

FIG. 20 schematically illustrates an example of the above-mentioned "free RID list". Any implementing method for the "free RID list" may be employed as long as the usable index values can be speedily obtained and the index values are prohibited from being used twice when the "RID" is issued.

(8) Processing "RBox" and "RID"

A discussion is now given of processing executed on the "RBox" and the corresponding "RID" upon performing initialization in the object-oriented OS and issuing the method "SendWithRBox", "Receive", or "Reply".

(8-1) Initializing "mCOOPMailer"

When the object "mCOOPMailer" is initialized, a required number of "RBox"s is first reserved in memory. Then, the same number of data structures "RIDListNode"s required for the "free RID list" and the "unavailable RID list" as the number of the "RBox"s are reserved in the memory. Subsequently, the "RBoxEntryTable" for managing the "RBox" and the corresponding "RID" is reserved in the memory. In this case, the number of entries in the "RBoxEntryTable" is equal to the number obtained by adding one to the number of the "RBox"s.

Thereafter, the index "0" of the "RBoxEntryTable" is registered as an invalid value of the "RID". The address value of the "RBoxEntryTable" is also set to be "0x00000000" (NULL), and the counter value is set to be "0".

Entries of all the "RBox"s corresponding to the valid "RID"s (which are other than the invalid value of the "RID" set above) are then set in the "RBoxEntryTable". More specifically, an initial value is set in one of the entries other than the entry corresponding to the index "0" of the "RBoxEntryTable". The address value of the previously created "RBox" is then registered as the address of the "RBoxEntryTable", and the maximum (for example, $2^{18}-1$) of the valid counter values is registered as the counter. Subsequently, the value of the "RID" is generated by combining the index value and the counter value, as indicated by the format of FIG. 17, and is set in the data structure "RIDListNode". The data structure "RIDListNode" is then input into the "free RID list". The aforementioned procedure is repeated as many times as the number of "RBox"s, and the initializing operation is then completed.

(8-2) Processing Executed upon Issuing "SendWithRBox"

The processing executed upon issuing the method "SendWithRBox" by an application object is now described.

Upon issuing the method "SendWithRBox" by an application object, processing is shifted to the method "SendWithRBox" of the object "mCOOPMailer". The object "mCOOPMailer" then checks the basic factors, such as a determination of whether the "OID" specified as the identification of a destination is valid, and a determination of the presence or the absence of the object corresponding to the "OID". The "RBox" and the corresponding "RID" are then determined, and further processing is executed for transferring the "RID" to the object that has issued the method "SendWithRBox". Subsequently, the operation for transferring a message is performed.

(8-3) Processing Executed while Operation for "SendWithRBox" is being Performed

A description is now given of the processing executed on the "RBox" and the corresponding "RID" while the operation for the "SendWithRBox" is being performed.

It is first checked whether there is any data structure "RIDListNode" in the "free RID list". If there is an available structure, the "RID" of such a structure is reserved as a "RID" to be issued and is erased from the "free RID list" and is input into the "unavailable RID list". If there is no data structure "RIDListNode" in the "free RID list", the value "sRBOXCANNOTBECREATED" of the type "sError" is returned to the application object. The operation for the method "SendWithRBox" is then completed.

Thereafter, the address value registered in the entry corresponding to the index value of the "RID" is obtained from the table "RBoxEntryTable". The address value represents the address of the "RBox" corresponding to the above "RID", thereby making it possible to directly access the "RBox". Attributes to be set in the "RBox" are thus determined. The attributes may include the "OID" of the object which owns the "RBox" (i.e., the object that has issued the "SendWithRBox"), and setting of a variable for the flag representing the wait state.

Finally, the operation for transferring the valid "RID" acquired in the above processing to the application object that has issued the method "SendWithRBox" is performed. This operation is performed in a memory region in which the arguments used in the method "SendWithRBox" issued by the application object are transferred to the object "mCOOPMailer".

(8-4) Processing Executed upon Issuing "Receive"

The processing executed upon issuing the method "Receive" by an application object is now discussed.

Upon issuing the method "Receive" by an application object, processing is shifted to the method "Receive" of the object "mCOOPMailer". The object "mCOOPMailer" then checks the basic factors, such as a determination of whether the designated value of the "RID" is valid. If the "RID" is an invalid value, the value "sINVALIDRID" is returned to the application object, and the processing for the method "Receive" is then completed.

Processing is then executed according to the state of the "RBox" obtained by the value of the "RID". If a result message has not yet been sent to the "RBox", the application object that has issued the method "Receive" enters the standby position until the method "Reply" is issued by another object to send a result message to the "RBox".

If a result message has been sent to the "RBox", the method "Reply" has already been issued. Thus, the result message is sent to the object that has issued the method "Receive", and the processing is then reset. In this case, since the "RBox" and the corresponding "RID" are no longer necessary, the "RBox" is released, and the "RID" is nullified.

(8-5) Processing Executed while Operation for "Receive" is being Performed

A description is now given of the processing executed on the "RBox" and the corresponding "RID" while the operation for the method "Receive" is being performed.

After it is checked that the specified "RID" is valid, the index value of the "RID" is acquired. The counter value of the "RID" is also obtained. Then, the counter value registered in the entry corresponding to the index value of the "RID" is obtained from the table "RBoxEntryTable". The counter value (which forms the "RID") directly acquired from the "RID" is then compared with the counter value obtained by using the index value of the "RBoxEntryTable".

When the two counter values are equal to each other, it is confirmed that the value of the "RID" specified by the method "Receive" is usable by the system, and the operation for "Receive" continues to be performed. On the other hand, if the two counter values do not coincide with each other, it is determined that the value of the "RID" is not usable by the system. In this case, the object "mCOOPMailer" returns the value "sRIDNOTFOUND" of the type "sError" to the application object that has issued the method "Receive", and the processing for the method "Receive" is then completed.

If it is found that the "RID" is usable by the system, the address value registered in the entry corresponding to the index value in the "RBoxEntryTable" is obtained in order to check the "RBox" corresponding to the "RID". By checking the attributes of the "RBox", as discussed above, it is determined whether a result message has already been sent to the "RBox".

If a result message has been sent to the "RBox", the operation for nullifying the used "RID" is performed after conducting the operation for transferring a message. In the nullifying operation, the counter value of the "RBoxEntryTable" corresponding to the index value of the used "RID" is decremented. Accordingly, even if the used "RID" is erroneously reused, it can be determined that the "RID" is not usable by the system, since the counter value of the "RID" differs from that registered in the "RBoxEntryTable". The "RID" is then released from the "unavailable RID list" and is input into the "free RID list".

When the "RBox" corresponding to an index value is reused many times and the counter value is decremented to "0", whether the "RID" is allowed to be used again is determined by the requirements of the system or the application.

For example, if a sufficient number of bits are reserved for the counter value, and if it is guaranteed that the used "RID" be not reused in the program while the counter value ranges from the maximum value to "0", the counter value which has reached "0" may be reset to the maximum value.

Conversely, it may be determined that the same value of the "RID" is absolutely prohibited from being reused in the program. In this case, when the counter value reaches "0", the "RID" corresponding to the index value is made unavailable, in which case, the "RID" contained in the "unavailable RID list" is not input into the "free RID list".

If a result message has not yet been sent to the "RBox", a variable for the flag indicating that the "RBox" is in the standby position may be set, thereby causing the application object which has issued the method "Receive" to enter the standby position. The processing is then completed.

(8-6) Processing Executed upon Issuing "Reply"

A description is now given of processing upon issuing the method "Reply" by an application object, in particular, of the processing concerning the "RBox" and the corresponding "RID".

Upon issuing the method "Reply" by an application object, the processing is shifted to the method "Reply" of the object "mCOOPMailer". The "mCOOPMailer" then first acquires the "RID" sent to the application object that has issued the "Reply". The "RID" has been registered in the data structure "mCOOPMailerDescriptor" in which the information required for performing message passing by the object "mCOOPMailer" are stored in units of objects.

If a result message has not yet been sent to the "RBox" corresponding to the "RID", the result message specified by the method "Reply" is sent to the "RBox". In contrast, if a result message has already been sent to the "RBox", the issuing of the method "Reply" and the processing therefor do not make sense, and the "sINVALIDREPLY" of the type "sError" is thus returned. The processing for the "Reply" is then completed.

(8-7) Continuing to Execute Processing for "Reply"

If the processing for the method "Reply" continues to be executed, it is checked whether the "RID" obtained above is usable by the system. The checking is made by a comparison between the counter value contained in the "RID" and the counter value registered in the "RBoxEntryTable", in a manner similar to the operation conducted in the method "Receive".

If it is found that the "RID" is usable by the system, the corresponding "RBox" is obtained by using the index value of the "RID" in the table "RBoxEntryTable". Then, the attributes of the "RBox" are checked to determine whether the "RBox" is waiting for a result message.

If the "RBox" is not in the standby position, a result message has already been sent to the "RBox", and the processing for the method "Reply" is then completed. Conversely, if the "RBox" is in the standby position, the method "Receive" has already been issued by specifying the above-described "RID", and the processing for transferring a result message to the object that has issued the method "Receive" is immediately executed. At the same time, the "RID" corresponding to the used "RBox" is nullified according to an operation similar to that employed in the method "Receive".

In the aforementioned object-oriented OS, the "RID" format is determined in such a manner that the counter portion has 18 bits and the index portion has 14 bits so that a maximum number of $2^{14}=16,384$ "RBox"s can be managed. However, the number of entries in the table "RBoxEntryTable" is not necessarily the above maximum number.

It is not necessary for the system to invariably handle a maximum number (16,384) of "RBox"s, but rather, a smaller number of "RBox"s often suffices. For example, if a system sufficiently handles only 124 "RBox"s, the number of entries in the above "RBoxEntryTable" may be 125 according to the foregoing embodiment.

In the foregoing description, for the purpose of brevity, the possible maximum number of "RBox"s and the corresponding "RID"s that may be handled by the system are initialized. However, for optimizing the use of the memory while the system is operating, only a required minimal number of "RBox"s and the corresponding "RID"s may be initialized first, and then, more "RBox"s and the corresponding "RID"s may be added and set while the system is running.

In the foregoing description, the maximum range of the index value may be from 0 to 16,383. If, however, only 124 "RBox"s are managed, the index values ranging from 0 to 124 are sufficiently used. In this case, 125 or greater index values are saved for resources of the index and may be utilized after all the counter values corresponding to the index values ranging from 1 to 124 are used.

In the foregoing description, the maximum range of the counter values is from 0 to 262,144. If, however, only 124 "RBox"s are managed, seven bits may be sufficient for the index portion ($2^7=128$). In this case, 25 bits may be assigned to the counter portion whose value may range from 0 to 33,554,431, thereby ensuring more resources for the counter values.

According to the technique for managing the usable index values in the "free RID list", the counter value of only a specific index may be frequently used under a certain condition. Such a condition is, for example, as follows. It is now assumed that the maximum number (124) of "RBox"s is managed and that almost all the "RBox"s are occupied and there is only one remaining "RBox". If the 123 "RBox"s continue to be occupied and only one "RBox" has to be frequently used, the counter value only corresponding to the "RID" of the "RBox" is continuously decremented. Namely, if the index values are specifically and locally utilized, only the logical time of such index values advances, i.e., the counter is continuously decremented, thereby facilitating exhaustion of resources of the counter values. One of the approaches to overcome the above drawback is as follows.

It is determined that 248 index values, which is twice as many as the maximum number (124) of the "RBox"s, are taken. In this case, even under the situation in which there is only one remaining "RBox", i.e., only a specific "RID" is locally utilized, there are 125 counter values corresponding to the index value for the remaining "RID". This solves the aforementioned problem that only the logical time of the remaining index advances. In this technique, the resources of a counter value in relation to each index value are less than those achieved by the foregoing technique by one bit. However, this technique is more advantageous under the situation in which it is likely that only a specific index is locally utilized.

As discussed in the foregoing embodiment, the ratio of the index portion to the counter portion (or a time stamp portion) in the identifier format and the implementing method may be altered in accordance with the characteristics or the requirements of the system. However, the basic concept of the present invention may be applicable to any modification.

[3]

A description is now given of the object identifier "OID" used in the above-described object-oriented OS according to a second embodiment of the present invention. A data structure identifying method for using an identifier that is suitably used in an expandable system is first discussed.

According to the data structure identifying method of the second embodiment, the identifier includes a bit for differentiating the identifier formats (identifier format determining portion), thereby determining the length of the identifier and the presence or the absence of the network address portion.

Figure 21:
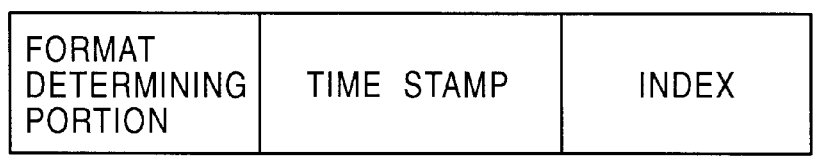
FIG. 21 illustrates an identifier format including a format determining portion.

FIG. 21 illustrates an example of such an identifier format including the format determining portion. Namely, the identifier is formed of a format determining portion, a time stamp portion, and an index portion.

As discussed above, the object serves as a unit of modules of the functions possessed by an application and also as a unit of executing such functions. Accordingly, if an application requires a certain function, it creates an object implementing the function and uses the function by message passing. If the object is no longer required, it is destroyed. In this manner, since the object is dynamically created or destroyed, the "OID" must be unique on a time axis.

In the first embodiment in which the "RID" is described, the counter is used for ensuring that the "RID" can be unique on a time axis. The "RID" is created or destroyed only when message passing is conducted, i.e., while the system is running. Accordingly, if, for example, the power supply of an apparatus is temporarily turned off, the counter value may be reset to the initial value.

The "OID", which is unique on a time axis, may also be reset to the initial value. On the other hand, the "OID" should not be reset to the initial value under a certain condition, for example, when an object is stored in a medium, such as a disk or a flash memory. Such an object (which is often referred to as "a permanent object") is required to be identified with the same "OID" even if the power supply of an apparatus is temporarily turned off. This requirement cannot be achieved by the use of the counter, and thus, a time stamp is utilized.

As discussed above, the time stamp requires a greater number of bits than the counter. More specifically, if it is assumed that the time needed for creating an object is 10 microseconds and the system should continue to run for approximately 20 years, 46 bits are required. Namely, since $2^{46}=7.04\times10^{13}$, the system can be operated for 195,465.73 hours or 22.31 years. Similarly, if the system is required to run for approximately 40 years, 47 bits are needed. Namely, since $2^{47}=1.14\times10^{14}$, the system can be operated for 390,937.47 hours or 44.63 years. If the system should continue to run for approximately 90 years, 48 bits are needed. Namely, since $2^{48}=2.8114^{14}\times10^{14}$, the system can be operated for 781,874.47 hours or 89.26 years.

Consequently, the "OID" using the counter has 32 bits or greater, while the "OID" using the time stamp has 64 bits or greater. In the aforementioned object-oriented OS, the "OID" using the counter is implemented by 32 bits, while the "OID" using the time stamp is implemented by 64 bits.

It is possible that one of the two "OID" formats may be used in one system and both "OID" formats may be used in another system. Accordingly, if the two "OID" formats are mixed in one system, the two "OID"s need to be differentiated.

According to the "OID" format including the format determining portion illustrated in FIG. 21, the 32-bit "OID" and the 64-bit "OID" can be differentiated within the OS. One bit may be assigned to the format determining portion of the "OID".

(1) "OID" Used when Apparatuses are Connected via Network

A discussion is further given of the "OID" when apparatuses are connected via a network. In this case, an application may be communicated between apparatuses within the network. The "OID" format described above is valid only within the host apparatus. It is therefore necessary to include a network address to the elements of the "OID" in order to perform communications between the apparatuses via the network by using the "OID".

The addition of the network address increases, however, the number of bits required for the "OID" format by an amount of the network address. The network address is important to send a message to an object executing on another apparatus within the network. However, once the message is sent to the apparatus, the network address is no longer necessary nor is it required if a destination of a message specified by a certain "OID" is an object executing on the same apparatus.

As a consequence, it is necessary to distinguish the "OID" containing a network address from that without a network address. The presence or the absence of the network address can be achieved by the "OID" format including a format determining portion, such as the one illustrated in FIG. 21. One bit may be assigned to the format determining portion. Alternatively, one bit may be assigned to each of a determination of the 32-bit format and the 64-bit format and a determination of the presence or the absence of the network address.

[4]

A description is now given of a third embodiment of the present invention incorporating the above-described object-oriented OS.

In the third embodiment, two examples are given in which the operation for creating or destroying identifiers by the aforementioned identifier manager is applied to the object-oriented OS.

In the first example, the "mCOOP message passing" is discussed. The fundamental features of this object have been discussed above, and only complementary features are thus explained below. The second example is concerned with a graphics driver.

(1) Relationship between "mCOOP message passing" and Identifier Management

In the first example applied to the "mCOOP message passing", identifiers required for prohibiting an application from directly accessing a data structure managed by the OS are discussed. As noted above, the identifiers handled in the "mCOOP message passing" include the object identifier "OID", the RBox identifier "RID", and the event identifier "Event ID".

The three basic APIs for the "mCOOP message passing" are as follows.

Method "SendWithRBox"

Method "Reply"

Method "Receive"

Among the above APIs, the "OID" is used only in the method "SendWithRBox", and the "RID" is used in all the APIs. The "Event ID" is not employed in the above APIs. Accordingly, an example of the "RID" has been described in detail in the foregoing embodiment.

The method "SendWithRBox" is an API for requesting message sending, in which case, the "RID" is created. The operation for creating the "RID" has been discussed above.

The method "Reply" is an API for sending a result message "Results", and the method "Receive" is an API for receiving a result message "Results", and in both cases the "RID" is explicitly or implicitly employed. The operation for checking the "RID" is similar to that for the above-described identifiers.

Upon issuing the method "Reply" or "Receive" and finally sending a result message "Results" correctly, the used "RID" is required to be nullified. The operation for destroying (nullifying) the "RID" is similar to the destroying operation of the identifiers discussed above.

(2) Object-oriented OS for Use in Graphics Driver

In the second example, the object-oriented OS for use in a graphics driver is discussed below. In this example, a description is given of identifiers required for prohibiting a client from accessing a data structure managed by a server according to an object-oriented technique.

Figure 22:
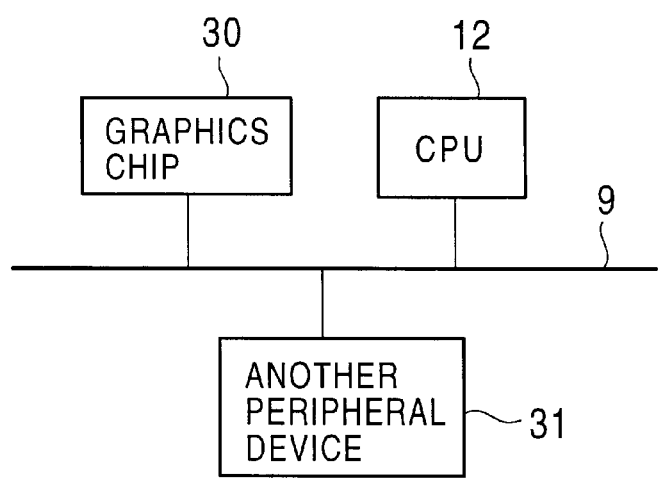
FIG. 22 is a block diagram illustrating the configuration of the main portion of graphics driver hardware incorporating the present invention.

FIG. 22 is a block diagram illustrating the configuration of the main portion of hardware implementing this example. In FIG. 22, a graphics chip 30 is connected to a CPU 12 via a bus 9, and another peripheral device 31 may be connected to the CPU 12 via the bus 9.

Figure 23:
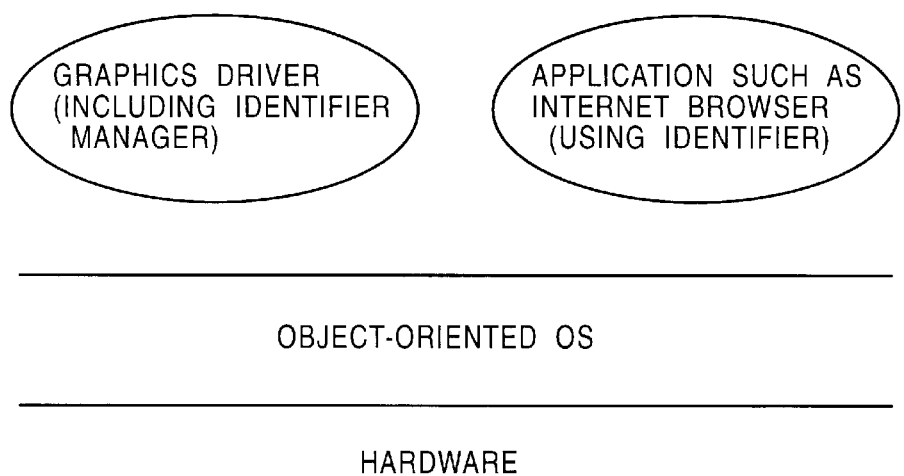
FIG. 23 illustrates a software architecture including the graphics driver hardware shown in FIG. 22.

FIG. 23 illustrates a software architecture including a graphics driver. Namely, the object-oriented OS is realized on the hardware shown in FIG. 22. A graphics driver object or an application object further runs on the object-oriented OS. As the application object, an Internet browser may be used. The Internet browser utilizes the functions of the graphics driver used for displaying characters or pictures on a monitor or a television screen.

The APIs for using the functions (services) of the above-described graphics driver may be as follows, which are part of the APIs implemented on the graphics driver on the object-oriented OS.

AgfxError NewPixelMap(in PixelMapDescriptor pixelMapDescriptor, in MemoryRegionID, out PixelMapID)

AgfxError DeletePixelMap(in PixelMapID pixelMapID)

AgfxError Copy(in PixelMapID sourcePixelMapID, in Coordinate sourceCoordinateTopLeft, in PixelMapID destinationPixelMapID, in Coordinate destinationCoordinateTopLeft, in width, in height)

AgfxError ReadPixel(in PixelMapID pixelMapID, in Coordinate coordinate, out Color color)

AgfxError WritePixel(in PixelMapID pixelMapID, in Coordinate coordinate, in Color color)

"NewPixelMap" is an API for creating a data structure "PixelMap" within the graphics driver and for creating the corresponding identifier "PixelMapID". The data structure "PixelMap" is managed by the graphics driver and manages the width and the length of image data and also the internal data of the graphics driver. The graphics driver user is unable to directly access the data structure "PixelMap" but is able to designate it by using the identifier "PixelMapID".

The first argument of the API "NewPixelMap" is a structure for reporting the width and the length of image data to the graphics driver. The second argument of "NewPixelMap" is an identifier for specifying the memory region required for creating the data structure "PixelMap". The third argument of "NewPixelMap" is the identifier "PixelMapID" to be created. The operations and the configuration of the "PixelMapID" are similar to those described above.

"DeletePixelMap" is an API for deleting the data structure "PixelMap" specified by the identifier "PixelMapID". By use of this API, the data structure "PixelMap" and the identifier "PixelMapID" are deleted. The operation is similar to that discussed above.

The other APIs are "Copy", "ReadPixel", and "WritePixel". "Copy" is an API for copying an image from a specified data structure "PixelMap" to another data structure "PixelMap" by designating the coordinates and the size of the image. "ReadPixel" is an API for reading the color of the designated coordinates within a data structure "PixelMap". "WritePixel" is an API for writing a designated color into the designated coordinates within a data structure "PixelMap".

For designating a data structure "PixelMap", the identifier "PixelMapID" is used. The graphics driver is able to check whether the "PixelMapID" is correct according to the method described above. Thereafter, the data structure "PixelMap" can be accessed speedily (without searching a list or a table) by using the address of the entry in the table "PixelMapEntryTable" corresponding to the index value of the "PixelMapID".

The length required for expressing the "PixelMapID" is only 32 bits even though it is ensured that the "PixelMapID" is unique on a time axis. This is because the identifier format of the present invention is used.

[5]

Finally, a description is given of the configuration of an apparatus incorporating the data structure identifying method of the present invention.

Figure 24:
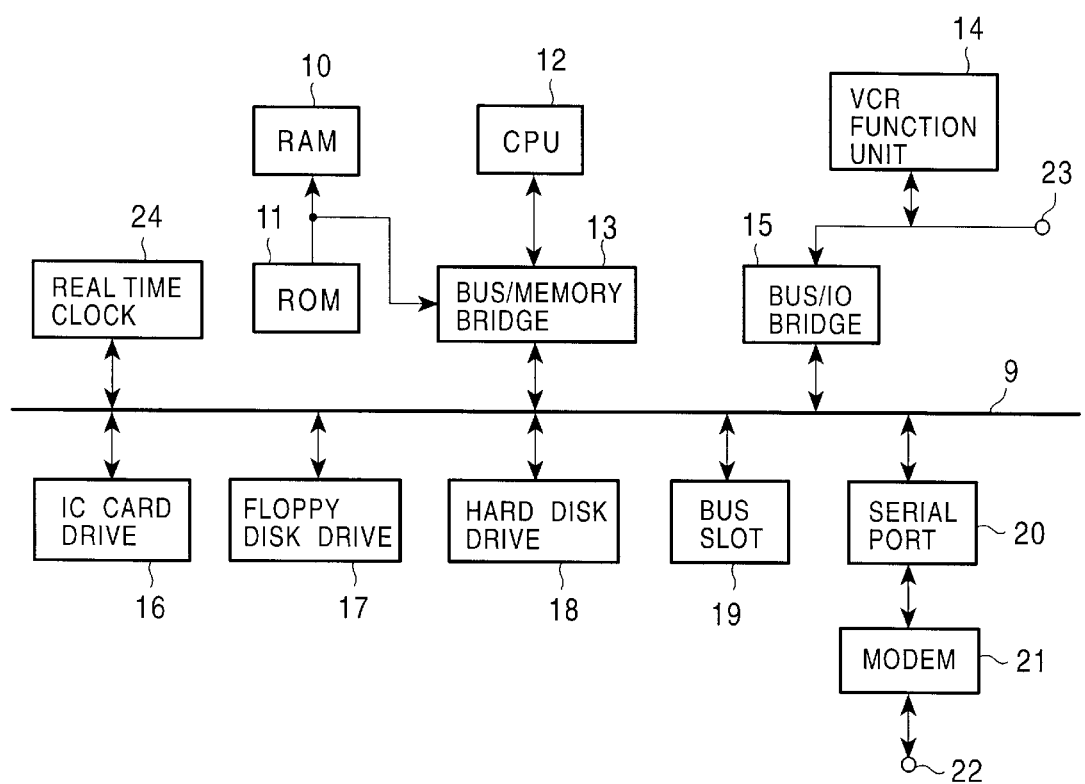
FIG. 24 is a block diagram illustrating the configuration of an apparatus incorporating the present invention.

FIG. 24 is a block diagram illustrating the configuration of an apparatus incorporating the above-described data structure identifying method of the present invention. The apparatus shown in FIG. 24 is a video cassette recorder (hereinafter referred to as "VCR") for recording/reproducing signals by means of a video cassette containing video tape within a cassette.

The present invention may be used in audio-visual machines (AV machines) other than a VCR, office machines, and general-purpose computers.

In the VCR illustrated in FIG. 24, a VCR function unit 14 mainly serves as a video cassette recorder for recording/reproducing data by using a video cassette. The data recorded on or reproduced from the video cassette by the VCR function 14 is transmitted to another apparatus via a bus/IO bridge 15 and a bus 9 and is input into or output from an external source via a terminal 23.

A central processing unit (CPU) 12 serves as a controller for controlling the individual elements connected to the bus 9 via a bus/memory bridge 13.

A comparatively small-capacity random access memory (RAM) 10 serves as a work area. Stored in the RAM 10 are tables, such as the aforementioned "StructEntryTable" and "RBoxEntryTable", and lists, such as the above-described "free StructID list" and "free RID list".

A read only memory (ROM) 11 stores programs concerning the OS as well as programs concerning the basic functions. Namely, the CPU 12 controls the individual elements based on the programs stored in the ROM 11 and uses the RAM 10 as a work area.

An integrated circuit (IC) card drive 16 contains within a card-like casing a slot for receiving an IC card, which is a storage medium provided with an IC, and an IC card driving portion for reading/writing data from/into the IC card. A floppy disk drive 17 has a slot for receiving a floppy disk, a rotation driving portion for driving the rotation of the floppy disk, and a head for recording/reproducing data on/from the floppy disk. Thus, various data can be recorded or application software can be installed via the floppy disk drive 17. A hard disk drive 18 includes a rotation driving portion for driving the rotation of a hard disk and a head for recording/reproducing data on/from the hard disk.

A bus slot 19 is an extension terminal used for adding an expansion board. A serial port 20 is an input/output portion through which the VCR performs data communications with an external source via a modem (MODEM) 21 and a terminal 22. A real time clock 24 is a clock that supplies real time information.

In addition to the functions of ordinary VCRs, the above-described VCR is able to install additional application software. For example, if it is desired that the user update the VCR (add a new function to the VCR), additional function software may be installed by means of a recording medium, such as an IC card or a floppy disk, or via a network line, such as the Internet.

In the above-described VCR, the OS incorporating the aforementioned data structure identifying method of the present invention is used. This enables the user to upgrade the functions of the VCR without needing to replace it with a new one. Namely, an application program created by the programmer and supplied to the user is installed on the VCR by means of a recording medium or via a network line, thereby making it possible to update the VCR without troubling the user to perform a specific operation. The above software programs are constructed by using the object-oriented technique.

The above-described floppy disk or the IC card serves as a recording medium of the present invention in which the aforementioned program is recorded. In addition to the above mediums, a CD-ROM may also be used as the recording medium of the present invention.

In the foregoing description, it is assumed that the data structure identifying method is implemented in the OS integrated into an apparatus, and a 32-bit processor, which is currently the mainstream, is used. The present invention may be, however, applied to a system using a processor other than the above type.

As is seen from the foregoing description, the present invention offers the following advantages.

Objects or data structures are differentiated by an identifier that contains the index corresponding to the address used for checking the object or the data structure, thereby reducing a required number of bits and maintaining a high level of system performance. The above identifier includes a format determining portion for determining the format of the identifier. Accordingly, it is possible to provide a data structure identifying method using an identifier that is suitably used in an expandable system.

In a recording medium in which a data structure identifying program for differentiating between objects or data structures by using an identifier is recorded, the objects or data structures are differentiated by using an identifier that contains the index corresponding to the address used for checking the object or the data structure. It is thus possible to provide a recording medium in which a data structure identifying program is recorded in which only a small number of bits are required and in which a high level of system performance can be maintained.

As a result, the required memory size can be reduced, and computation can be speedily performed on identifiers without needing to search a table or a list. Further, an expandable software system can be constructed.

What is claimed is:

1. A machine-implemented data structure identifying method comprising the steps of:
   differentiating between objects or data structures by using an identifier, said identifier including an index value corresponding to an address used for referencing the object or the data structure, wherein the index value is used in place of the address in said identifier; and,
   obtaining the address of an object or data structure from a table of index values and addresses, with the use of said index value of said identifier.

2. A data structure identifying method according to claim 1, wherein said identifier is formed by a combination of the index value and a time stamp or a counter, which ensures that said identifier is unique on a time axis.

3. A data structure identifying method according to claim 1, further comprising the steps of:
   creating a table for representing the relationship between index values, addresses of objects or data structures, and counter values, and
   comparing a counter value of said identifier and a counter value stored in the table corresponding to the index value of the identifier, wherein if the comparison is favorable the identifier is determined to be valid.

4. A machine-implemented data structure identifying method comprising the steps of:
   differentiating between objects or data structures by using an identifier, said identifier including a counter value and an index value, said index value corresponding to an address used for referencing the object or the data structure;
   creating a table for representing the relationship between index values, counter values and addresses of objects or data structures;
   comparing the counter value of said identifier and a counter value stored in the table corresponding to the index value of the identifier, wherein if the comparison is favorable the identifier is determined to be valid; and
   selectively nullifying an identifier by decrementing a counter value thereof.

5. A machine-implemented data structure identifying method comprising the step of differentiating between objects or data structures by using an identifier, said identifier including an index value corresponding to an address used for referencing the object or the data structure, wherein said identifier has an invalid value which is set to be zero, thereby enabling a determination as to whether said identifier is invalid.

6. A machine-implemented data structure identifying method comprising the step of differentiating between objects or data structures by using an identifier, said identifier including an index value corresponding to an address used for referencing the object or the data structure, wherein said identifier has a format determining portion for determining a format of said identifier, said format determining portion having at least one of: (i) at least one bit for differentiating between an identifier format using a time stamp and an identifier using a counter; (ii) at least one bit for differentiating lengths of different identifier formats; and (iii) at least one bit for determining the presence or absence of a network address.

7. A data structure identifying method according to claim 6, wherein said format determining portion has said at least one bit for differentiating between an identifier format using a time stamp and an identifier format using a counter.

8. A data structure identifying method according to claim 6, wherein said format determining portion has said at least one bit for differentiating lengths of different identifier formats.

9. A data structure identifying method according to claim 6, wherein said identifier has said at least one bit for determining the presence or absence of a network address.

10. A data structure identifying method according to claim 6, wherein the index value is used in place of the address and is used as an index value corresponding to the address contained as an entry in a table of addresses.

11. A recording medium in which a program is recorded, wherein said program causes a processing device to perform the steps of:
    differentiating between objects or data structures by using an identifier, said identifier including an index value corresponding to an address used for referencing the object or the data structure, wherein the index value is used in place of the address in said identifier; and,
    obtaining the address of an object or data structure from a table of index values and addresses, with the use of said index value of said identifier.

12. A recording medium in which a program for differentiating between objects or data structures by using an identifier is recorded, wherein said identifier includes an index value corresponding to an address for referencing the object or the data structure and a format determining portion for determining a format of said identifier, said format determining portion having at least one of: (i) at least one bit for differentiating between an identifier format using a time stamp and an identifier using a counter; (ii) at least one bit for differentiating lengths of different identifier formats; and (iii) at least one bit for determining the presence or absence of a network address.

13. A recording medium according to claim 12, wherein said format determining portion has said at least one bit for differentiating between an identifier format using a time stamp and an identifier format using a counter.

14. A recording medium according to claim 12, wherein said format determining portion has said at least one bit for differentiating lengths of the different identifier formats.

15. A recording medium according to claim 12, wherein said identifier has said at least one bit for determining the presence or the absence of a network address.

16. A recording medium in which a program for differentiating between objects or data structures by using an identifier is recorded, said program causing a device to perform the steps of:
    differentiating between objects or data structures by using an identifier, said identifier including a counter value and an index value, said index value corresponding to an address used for referencing the object or the data structure;
    creating a table for representing the relationship between index values, counter values and addresses of objects or data structures;
    comparing the counter value of said identifier and a counter value stored in the table corresponding to the index value of the identifier, wherein if the comparison is favorable the identifier is determined to be valid; and
    selectively nullifying an identifier by decrementing a counter value thereof.

17. A recording medium in which a program for differentiating between objects or data structures by using an identifier is recorded, wherein said identifier includes an index value corresponding to an address for checking the object or the data structure, wherein said identifier has an invalid value which is set to be zero, thereby enabling a determination as to whether said identifier is invalid.

* * * * *